US011238853B2

(12) United States Patent
Kurtz

(10) Patent No.: US 11,238,853 B2
(45) Date of Patent: Feb. 1, 2022

(54) KEYWORD-BASED AUDIO SOURCE LOCALIZATION

(71) Applicant: Comcast Cable Communications, LLC, Philadelphia, PA (US)

(72) Inventor: Scott Kurtz, Mount Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 84 days.

(21) Appl. No.: 16/669,195

(22) Filed: Oct. 30, 2019

(65) Prior Publication Data

US 2021/0134280 A1 May 6, 2021

(51) Int. Cl.
| | |
|---|---|
| G10L 15/20 | (2006.01) |
| G10L 15/22 | (2006.01) |
| G10L 15/30 | (2013.01) |
| G10L 25/84 | (2013.01) |
| H04R 1/40 | (2006.01) |
| H04R 3/00 | (2006.01) |

(52) U.S. Cl.
CPC .............. *G10L 15/20* (2013.01); *G10L 15/22* (2013.01); *G10L 15/30* (2013.01); *G10L 25/84* (2013.01); *H04R 1/406* (2013.01); *H04R 3/005* (2013.01); *G10L 2015/223* (2013.01)

(58) Field of Classification Search
CPC ......... G10L 15/30; G10L 15/32; G10L 25/84; G10L 15/20; G10L 15/08; G10L 15/22; G10L 2015/223; G10L 2015/228; G10L 2021/02166; G10L 2015/088; H04R 1/406; H04R 3/005
See application file for complete search history.

(56) References Cited

U.S. PATENT DOCUMENTS

| | | | |
|---|---|---|---|
| 7,099,821 B2 | 8/2006 | Visser et al. | |
| 8,345,890 B2 | 1/2013 | Avendano et al. | |
| 9,502,048 B2 | 11/2016 | Every et al. | |
| 9,525,938 B2 | 12/2016 | Deshpande et al. | |
| 9,734,822 B1 | 8/2017 | Sundaram et al. | |
| 9,820,042 B1 | 11/2017 | Ray et al. | |
| 9,838,784 B2 | 12/2017 | Vallabhan et al. | |
| 2012/0020485 A1 | 1/2012 | Visser et al. | |
| 2013/0195296 A1 | 8/2013 | Merks | |
| 2016/0358619 A1 | 12/2016 | Ramprashad et al. | |
| 2019/0073999 A1* | 3/2019 | Premont | ................. G10L 15/08 |
| 2019/0237067 A1 | 8/2019 | Friedman et al. | |

FOREIGN PATENT DOCUMENTS

| | | | |
|---|---|---|---|
| DE | 102013016806 A1 * | 4/2015 | ......... B60R 16/0373 |
| DE | 102016212647 A1 * | 6/2017 | ......... B60R 16/0373 |
| DE | 102016212647 A1 | 6/2017 | |
| WO | 2017138934 A1 | 8/2017 | |

OTHER PUBLICATIONS

Mar. 10, 2021—European Search Report—EP 202004920.1.

* cited by examiner

*Primary Examiner* — Yogeshkumar Patel
(74) *Attorney, Agent, or Firm* — Banner & Witcoff, Ltd.

(57) ABSTRACT

Systems, apparatuses, and methods are described for determining a direction associated with a detected spoken keyword, forming an acoustic beam in the determined direction, and listening for subsequent speech using the acoustic beam in the determined direction.

20 Claims, 10 Drawing Sheets

KEYWORD-BASED AUDIO SOURCE LOCALIZATION

BACKGROUND

Some devices, such as smart speakers and smart phones, are able to detect and respond to the human voice. However, it can sometimes be challenging for such a device to distinguish between the person speaking and other sounds that may also be occurring in the environment. For example, while a person is speaking, a television may be playing in the background, or another person may be talking at the same time. If the device is unable to separate the source of the person speaking from the other sounds, the device may have difficulty understanding what is being said to the device.

SUMMARY

The following summary presents a simplified summary of certain features. The summary is not an extensive overview and is not intended to identify key or critical elements.

Systems, apparatuses, and methods are described for localizing an audio source within an environment of a device. For example, the device may localize the audio source to a particular direction relative to the device and/or distance from the device. The audio source may be, for example, a person speaking. While the person is initially speaking, the device may be in a keyword (e.g., a wake word such as the phrase "Hey [device or service name, such as Xfinity]") listening mode, in which the device listens for a keyword from multiple directions and/or from any direction. During that time, the person may speak a keyword that is recognized by the device. The device may implement multiple listening zones, such as using one or more beamformers pointing in various directions around a horizontal plane and/or a vertical plane. Based on that detected keyword as detected by one or more of the listening zones, the device may determine the direction and/or distance of the person speaking, and form one or more active acoustic beams directed toward the person speaking. In doing so, the device may enter a directed subsequent speech listening mode. The one or more active acoustic beams may be used to listen for subsequent speech associated with the keyword. If it is determined that the subsequent speech has ended, or if there is a timeout (regardless of whether the subsequent speech has ended), the device may return to the keyword listening mode to resume listening for the next keyword.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
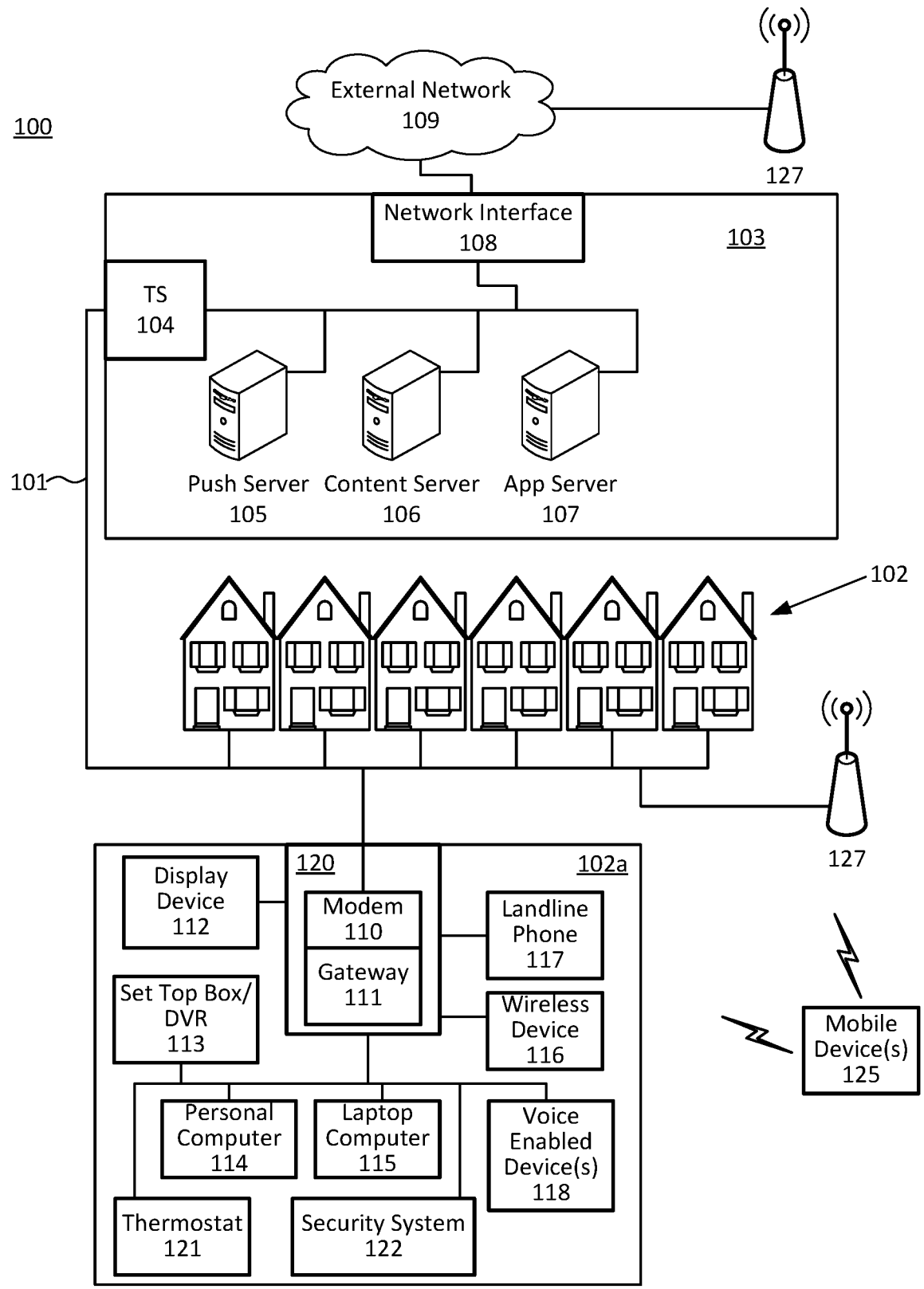
FIG. 1 shows an example communication network.

The accompanying drawings, which form a part hereof, show examples of the disclosure.

It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, which may receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as additional push, content, and/or application servers, and/or other types of servers. Although shown separately, the push server 105, the content server 106, the application server 107, and/or other server(s) may be combined. The servers 105, 106, 107, and/or other servers may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., one or more display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), voice-enabled devices 118, and/or any other desired devices such as a thermostat 121 and a security system 122. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Each of the one or more voice-enabled devices 118 may be capable of receiving and interpreting voice commands. The voice commands may be received via one or more microphones that are part of or otherwise connected to a particular voice-enabled device 112. Each of the one or more voice-enabled devices 118 may be the same device as any of the other devices 110-117, 120-122, or 125 mentioned above, or may be separate from those devices. For example, STB or DVR 113 may itself be a voice-enabled device. Other examples of voice-enabled devices include Internet-of-Things (IoT) devices such as smart speakers, smart TVs, smart appliances, smart thermostats, smart smoke detectors, smart electrical plugs and/or switches, smart lighting, smart locks, multimedia hubs, communication hubs, security systems, wearables, toys, remote controls, Wi-Fi routers, and any other devices such as those typically found around the home or office.

Each of the one or more voice-enabled devices 118 may further be capable of controlling another device in the communication network 100. For example, a particular voice-enabled device 118 may, in response to a voice command, communicate with another device such as the STB or the DVR 113 to cause it to record media content or to display media content via the display device 112. The communication between the voice-enabled device 118 and the other device (e.g., the STB or the DVR 113) may be a direct communication between the two devices or may be via one or more other devices such as the interface 120. If the device being controlled is itself a voice-enabled device, the device may control itself in response to the voice command. For example, if the STB or the DVR 113 is a voice-enabled device and has its own one or more microphones, the STB or the DVR 113 may, in response to a voice command it receives, record media content and/or display media content via the display device 112.

Figure 2:
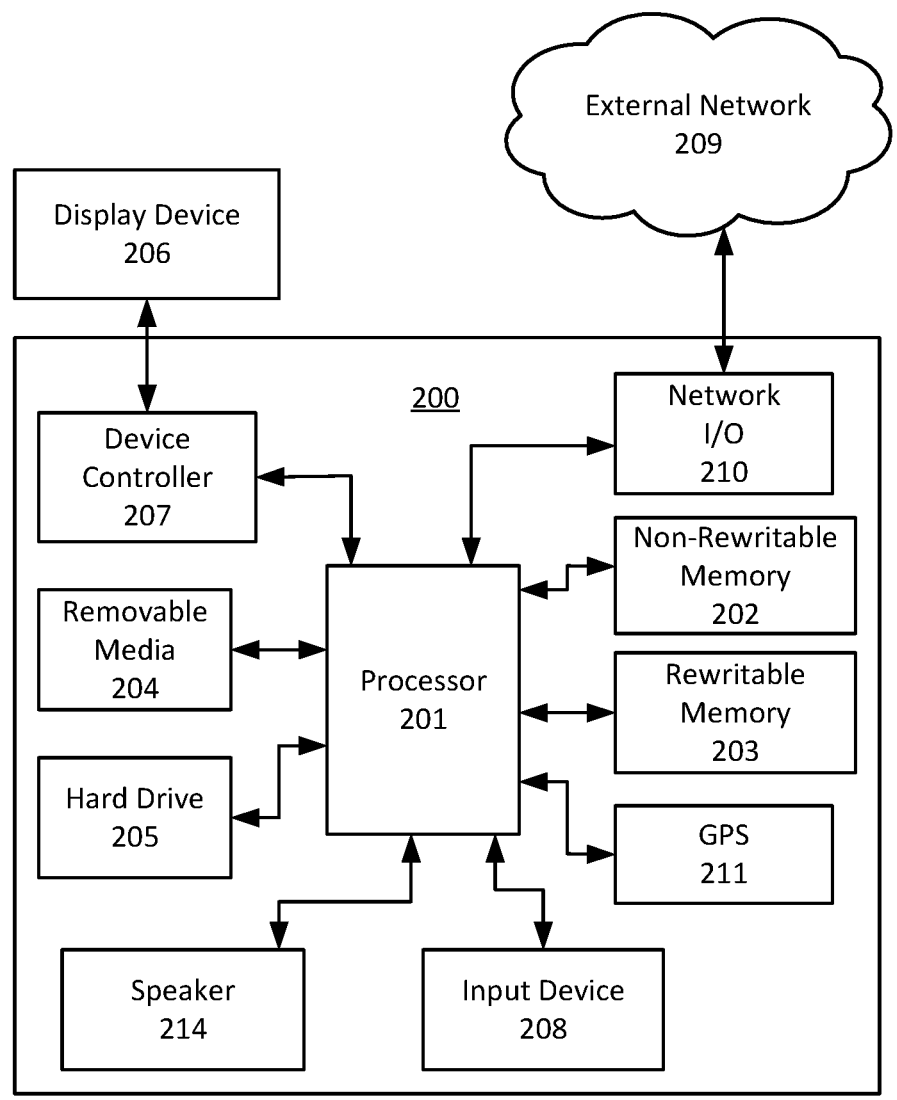
FIG. 2 shows hardware elements of a computing device.

FIG. 2 shows hardware elements of a computing device 200 that may be used to implement any of the devices shown in FIG. 1 (e.g., the mobile devices 125, any of the devices shown in the premises 102a, any of the devices shown in the local office 103, any of the wireless access points 127, any devices with the external network 109) and any other computing devices discussed herein. For example, each of the one or more voice-enabled devices may be or otherwise include a computing device, which may be configured such as computing device 200.

The computing device 200 may comprise one or more processors 201, which may execute instructions of a computer program to perform any of the functions described herein. The instructions may be stored in a non-rewritable memory 202 such as a read-only memory (ROM), a rewritable memory 203 such as a random access memory (RAM) and/or flash memory, a removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), one or more microphones (which may be arranged as one or more arrays of microphones), etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
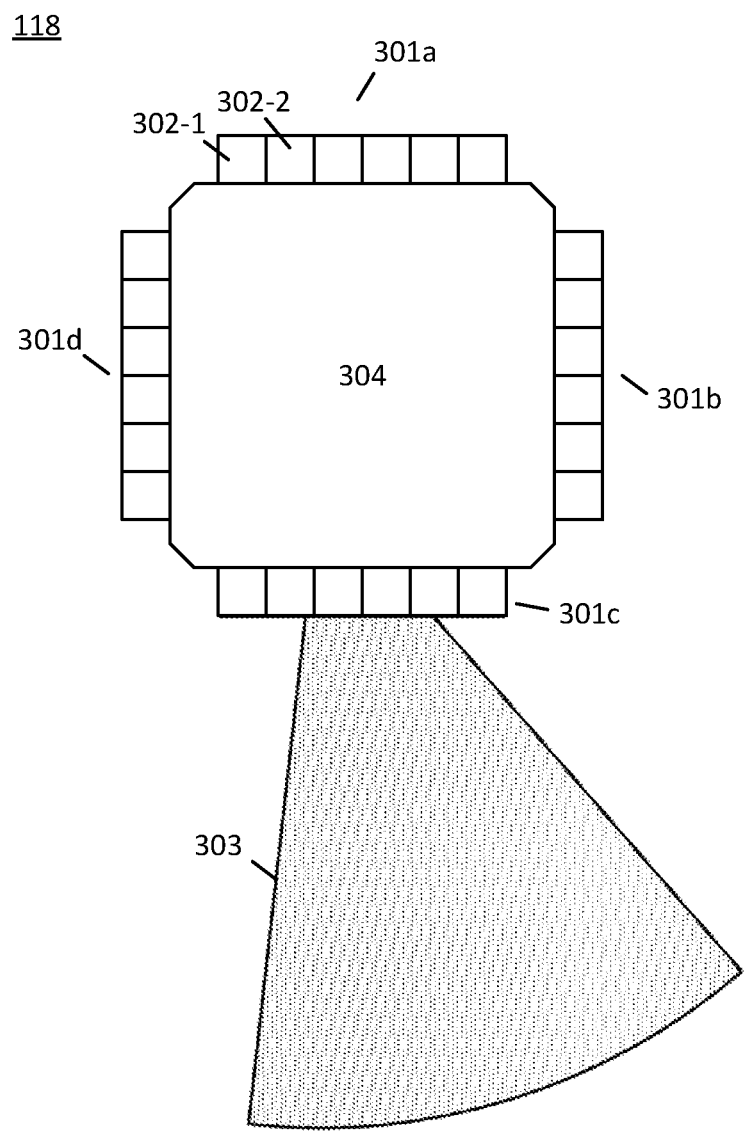
FIG. 3 shows an example implementation of a voice-enabled device.

FIG. 3 shows an example implementation of a voice-enabled device, such as one of the voice-enabled devices 118 or any other of the devices 110-117, 120-122, or 125. The voice-enabled device may include a structure 304 (such as a body or housing) that has one or more microphones for detecting sound. The one or more microphones may be implemented into one or more microphone arrays. For example, the voice-enabled device 118 may have microphone arrays 301a, 301b, 301c, and/or 301d, each pointing or otherwise optimized in a particular different direction. Each microphone array may be made up of two or more microphone elements, such as two or more microphone elements 302-1 and 302-2. In this example, each of the microphone arrays are arranged so as to be directed in directions approximately ninety degrees from another one of the microphone arrays. However, the microphone arrays may be arranged in any orientations relative to one another. Although four microphone arrays are shown, and although each microphone array is shown as having six microphones elements, the voice-enabled device may have any number of (one or more) microphone arrays, each having any number of (one or more) microphone elements. In addition, and although each microphone array is shown as having a planar configuration, each microphone array may have other configurations such as a curved configuration or a corner configuration.

Each microphone array may be capable of implementing acoustic beamforming such that the microphone array is able to narrow the directivity for which the microphone array is sensitive to incoming sound. To accomplish this, each microphone array may form an acoustic beam having certain characteristics, such as a particular direction, width (e.g., an angular width, such as in the range from just over zero degrees to 180 degrees, or even more than 180 degrees, or in the range from just over zero degrees to the width of one or more of the listening zones), and/or distance, such that the microphone array is more sensitive to incoming sound within that direction, width (e.g., angular width), and/or distance as compared with incoming sound outside of that direction, width, and/or distance. The beam may be formed using, e.g., known beamforming techniques such as by phase-shifting or delaying electrical signals generated by the individual microphone elements within the array with respect to one another and subsequently summing the resulting phase-shifted signals.

The acoustic beam may be directed in any direction, and may be of any width (e.g., angular width) and/or extend along any distance, as desired. For example, a given beam may be narrow and have a width of less than ten degrees. Or, the beam may be wider and have a width of more than forty-five degrees or more than ninety degrees. The acoustic beam may have a width less than, or equal to, the width of each of the listening zones. The microphone array may or may not be somewhat sensitive to sound coming from outside the beam, although the sensitivity outside the beam, if any, would be to a lesser degree than for sound coming from within the beam. FIG. 3 shows an example beam 303 generated by the microphone array 301c. Although one beam 303 is shown, each microphone array 301 may form multiple simultaneous beams, and more than one of the microphone arrays 301 may simultaneously form beams while other ones of the microphone arrays 301 are forming beams. Although the beam 303 is shown as having sharp and straight boundaries, this is an idealized beam shown for illustrative purposes only. Beams may have irregular shapes, may have multiple lobes, and may have non-sharp (e.g., fuzzy) boundaries.

Although the voice-enabled device 118 may be configured to form a fixed number of acoustic beams each having a fixed direction, width, and/or distance, the voice-enabled device 118 may additionally or alternatively be capable of dynamically forming and modifying over time one or more beams at any time, each in any direction, each having any width, and/or each having any distance, as desired. Thus, for example, the microphone array 301c may change the direction, width, and/or distance of the beam 303 over time, and/or may generate one or more additional beams simultaneously with the beam 303.

When changing the characteristics of a beam, the characteristics may be slowly and/or continuously changed, or they may be changed in steps, or they may be changed suddenly from a first set of characteristics to a second set of characteristics. Moreover, two or more of the microphone arrays may operate together to produce a beam having characteristics that may otherwise not be available using only one of the microphone arrays. For example, two microphone arrays, pointing in different directions and away from each other, may operate together to produce an acoustic beam that is pointing in a direction from between the two microphone arrays. In addition, the microphone arrays 301 may be configured to direct beams in varying horizontal and/or vertical directions relative to the voice-enabled device 118. Where the beam has both horizontal and vertical characteristics, the horizontal and vertical characteristics may be the same or different. For example, a beam may have a horizontal width and a relatively narrower or wider vertical width.

Figure 4:
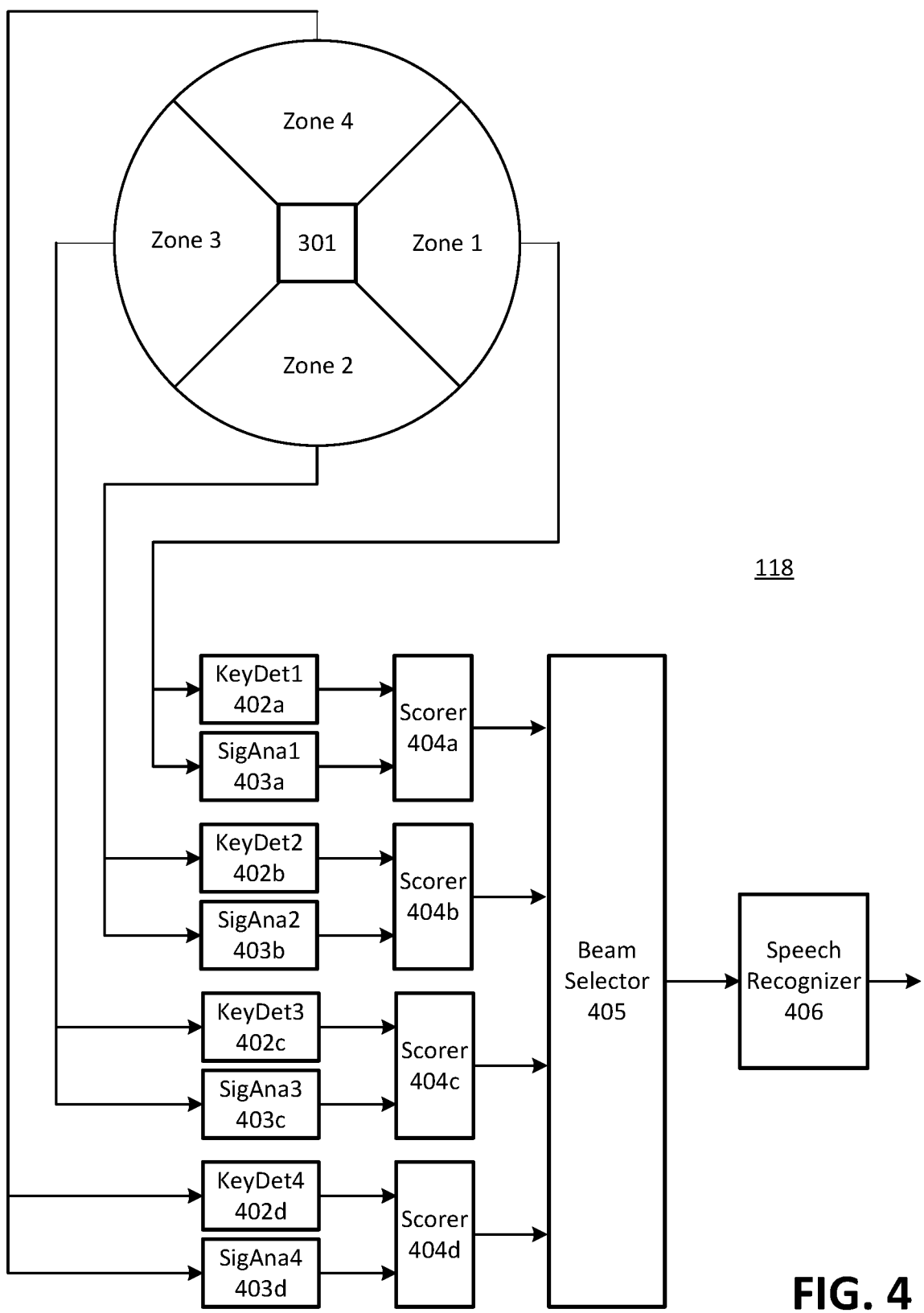
FIG. 4 shows an example detailed implementation of a voice-enabled device.

FIG. 4 shows an example detailed implementation of a voice-enabled device, which may be, for example, the same voice-enabled device 118 of FIG. 3. The various elements of the voice-enabled device 118 may be implemented as a computing device, such as the computing device of FIG. 2. For example, each of the elements 402, 403, 404, 405, and/or 406 may be implemented as software being executed by one or more processors (e.g., the processor 201) and/or as hardware of the computing device. Moreover, any or all of the elements 402-406 may be co-located in a single physical device (e.g., within a single housing of the voice-enabled device 118) and/or distributed across multiple physical devices. For example, one or more of the elements 402-406 may be part of the voice-enabled device 118, another of the elements 402-406 may be part of the interface 120, and/or yet another of the elements 402-406 may be implemented by a device in communication with the voice-enabled device 118 via the interconnected communication link 101, such as by the application server 107. Offloading some or all of the functionality of the elements 402-406 to another device may allow the physical user-side implementation of the voice-enabled device 118 to be a less expensive and/or less complex device, such as a thin client device. Thus, the voice-enabled device 118 may be a single physical device or may be distributed across multiple physical devices.

As shown in FIG. 4, the microphone array(s) 301 may be in a standby state by listening for voice commands in one or more listening zones, in this example listening zones 1 through 4. Any other number of listening zones may be used. The listening zones may be fixed (e.g., fixed direction, width, and distance) or they may vary over time, and they may touch each other and/or overlap with each other or they may not touch each other. The width of each listening zone may be the same for all of the listening zones, or they may have different widths. Each listening zone may be implemented as an acoustic beam, or as a result of the natural directivity of the microphone array(s) and/or of the microphone elements making up the microphone array(s). Moreover, each microphone array may be associated with one or more of the listening zones. For example, if there are N (e.g., four) microphone arrays, each microphone array may be associated with a different one of N (e.g., four) listening zones. Although a two-dimensional representation of the listening zones is shown, the listening zones may extend in, and be distributed throughout, three dimensions.

Microphone array(s) 301 may provide electrical signals, representing detected audio, to one or more keyword detectors 402, such as KeyDet1 402a, KeyDet2 402b, KeyDet3 402c, and/or KeyDet4 402d. Each keyword detector 402 may be associated with a different one of the listening zones. Thus, there may be the same number of keyword detectors 402 as there are listening zones. Each keyword detector 402 may be implemented as a separate software instance of a keyword detector, and/or as separate circuitry. Where each keyword detector 402 is a software instance, electrical signals generated by the microphone array(s) 301 may be received by circuitry of the voice-enabled device 118 (where the circuity may be part of, e.g., the input device 208) and converted to data or other information usable by its one or more processors (e.g., the processor 201) to implement the keyword detector(s) 402.

Each keyword detector 402 may analyze the detected audio to determine whether a keyword (such as a wake word) has been spoken. This may be accomplished using any speech recognition technique, such as speech recognition techniques known in the art. A keyword may be a single word, or it may be a phrase (e.g., a combination of words, such as in a particular order). Each keyword detector 402 may be constantly listening for a keyword. Each keyword detector 402 may recognize the keyword using, e.g., machine learning. In this case, a plurality of (e.g., thousands or more of) recorded utterances may be recorded and fed into a machine learning algorithm for training. Running the algorithm may result in a model that may be implemented for keyword detection by each keyword detector 402. The model (which may be stored, in e.g., the non-rewritable memory 202 and/or the rewritable memory 203) may result in a level of confidence generated by each keyword detector 402 that a particular detected utterance is a known keyword. For each of the keyword detectors 402, if it is determined that the level of confidence exceeds a predetermined threshold value or otherwise satisfies a predetermined criterion, that keyword detector 402 may conclude that the keyword has been spoken. As another example of keyword detection, each keyword detector 402 may compare the recognized speech with a dictionary of predetermined keywords to determine whether the speech sufficiently matches a keyword in the dictionary. Where a keyword dictionary is used, the keyword dictionary may be stored by the voice-enabled device 118 and/or by a different physical device, such as in the non-rewritable memory 202, the rewritable memory 203, the removable media 204, and/or the hard drive 205. In addition to or instead of a keyword dictionary, artificial intelligence may be used to determine whether the user intended to speak a keyword. Examples of keywords may include one or more words that are used for putting the voice-enabled device 118 in a particular listening mode, for getting the attention of the voice-enabled device 118, and/or otherwise for waking the voice-enabled device 118. For example, a keyword may be the phrase "hey [device or service name, such as Xfinity]." In response to detecting the keyword, the voice-enabled device may indicate a particular listening mode, such as by emitting an audio signal (e.g., a tone). In the particular listening mode, the voice-enabled device 118 and/or another device may listen for subsequent speech, which may include, e.g., command and/or inquiries. For example, the subsequent speech may include commands relating to assets (e.g., "play," "record," "display," "stop," "fast forward," "rewind," "pause," "skip," "back," "find"), commands relating to devices and/or system (e.g., "turn on," "turn off," "set alarm," "disable alarm," "set temperature," "start timer," "stop timer," "browse to," "set calendar item," "remind me," "settings"), inquiries (e.g., "when does . . . ," "what is . . . ," "how many . . . "), and/or any other keywords as desired.

In addition to recognizing spoken keywords, each keyword detector 402 may analyze the detected audio to determine speech-related characteristics of the keyword and/or of the subsequent speech, such as gender of the speaker, the age of the speaker, and/or the identity of the speaker based on known voice characteristics of one or more speakers. These known voice characteristics may be stored (e.g., as voice "fingerprints") by the voice-enabled device 118 and/or by a different physical device, such as in the non-rewritable memory 202, the rewritable memory 203, the removable media 204, and/or the hard drive 205.

Each keyword detector 402 may generate one or more output signals (e.g., in the form of data) indicating whether a spoken keyword has been detected in its respective listening zone, which keyword was spoken, a confidence level of whether the keyword was spoken, one or more alternative possible keywords that were spoken, the speech-related characteristics, and/or any other audio characteristics and/or other information associated with the detected spoken keyword. For example, the one or more signals generated by each of the keyword detectors 402 may indicate the above-mentioned level of confidence that a keyword has been spoken, and/or an indication that the level of confidence exceeds the predetermined threshold or otherwise satisfies the predetermined criterion.

The microphone array(s) 301 may also provide the electrical signals, representing the detected audio, to one or more signal analyzers 302, such as SigAna1 403a, SigAna2 403b, SigAna3 403c, and/or SigAna4 403d. Each signal analyzer 403 may be associated with a different one of the listening zones and/or with a different one of the keyword detectors 402. Thus, there may be the same number of the signal analyzers 403 as there are listening zones and/or as there are the keyword detectors 402. Each signal analyzer 403 may analyze one or more audio characteristics of the detected sounds, such as signal-to-noise ratio (SNR), amplitude, and/or frequency content. Each signal analyzer 403 may be implemented as a separate software instance of a signal analyzer, and/or as separate circuitry. Where each signal analyzer 403 is a software instance, electrical signals generated by the microphone array(s) 301 may be received by circuitry of the voice-enabled device 118 (where the circuity may be part of, e.g., the input device 208) and converted to data or other information usable by its one or more processors (e.g., the processor 201) to implement the signal analyzer(s) 403. Each keyword detector 402 may generate one or more output signals (e.g., in the form of data) indicating the one or more characteristics of the detected audio, such as the SNR, amplitude, and/or frequency content.

One or more scorers 404, such as scorers 404a-404d, may receive the outputs from respective ones of the key detectors 402 and/or respective ones of the signal analyzers 403. There may be one scorer 404 associated with each listening zone. Thus, for example, the listening zone 1 may be associated with the KeyDect1 402a, the SigAna1 403a, and the scorer 404a, and the listening zone 2 may be associated with the KeyDect2 402b, the SigAna2 403b, and the scorer 404b. Based on the received outputs, each scorer 404 may generate a score. The score may be based on a combination of the outputs of the respective keyword detector 402 and the respective signal analyzer 403, and may be indicative of, for example, how reliably the keyword was detected. For example, the scorer 404 may increase the score (so that the score is better) based on an increased confidence level of the detected keyword (as indicated by the respective keyword detector 402), and may also increase the score based on a higher SNR associated with the detected keyword. Although increased scores may be considered better, the scale may be opposite such that decreased scores are considered better. The score may be indicated as numeric data, but need not be. For example, the score may be indicated as alphanumeric data, other symbolic data, a signal frequency, or an analog voltage or current value.

As an example, it will be assumed that scores can start from a value of zero (least reliability) and increase with better scores. In such an example, a score of 7.6 (for example) would be considered a better score than a score of 3.5 (for example). Alternatively, the scores may start from a higher value, such as 10 (or 100, or any other value), and be decreased as the score is considered better. Thus, in such an example, a score of 3.5 would be considered a better score than a score of 7.6.

Regardless of how the scores are scaled, each scorer 404 may generate a score for one of the listening zones. Thus, in the example of FIG. 4, four scores would be generated for each detected keyword. The scores (which may be represented, for example, as data signals) may be passed to a beam selector 405, which may determine, based on the received scores, an active acoustic beam to be used to detect the remaining speech following the keyword. Such speech that follows (and is associated with) the keyword will be referred to herein as subsequent speech. For example, the subsequent speech may be or otherwise include a command and/or a target of that command, such as "play [name of content asset such as a movie]," "turn on bedroom lights," "set temperature to 73 degrees," or "set security system." The subsequent speech may be or otherwise include an inquiry, such as "what is the weather," "what's next on my calendar," or "how much does a blue whale weigh."

The beam selector 405 may use the scores from scorers 404 to determine which one or more beams to use to listen for the subsequent speech. Each acoustic beam, determined and used for listening for the subsequent speech associated with the detected keyword, will be referred to herein as an active beam. An active beam may be any beam, having any characteristics, as desired. For example, the active beam may be one of the listening zones that was used to listen for the keyword (e.g., the listening zones 1, 2, 3, or 4). Or, the active beam may be a narrower or wider beam irrespective of the listening zones.

For example, assume that the scorer 404a generates a score of 3 for the listening zone 1, the scorer 404b generates a score of 4 for the listening zone 2, the scorer 404c generates a score of 6 for the listening zone 3, and the scorer 404d generates a score of 8 for the listening zone 4. In one example, beam selector 405 may use these scores to determine that the highest reliability listening zone is the listening zone 4, and may select the listening zone 4 as the active beam for listening for the subsequent speech. Or, the beam selector 405 may use these scores to interpolate an active beam as being between the two highest listening zones, in this case the listening zones 3 and 4. Thus, in this example, beam selector 405 may determine the active beam as being a beam pointed in a direction somewhere between the listening zone 3 and the listening zone 4. And, since the listening zone 4 has a higher score than the listening zone 3, the beam may be pointed more toward the listening zone 4 than the listening zone 3. For example, beam selector 405 may calculate a weighted average of the directions of the listening zones 3 and 4, with the weighting being the scores of those respective listening zones.

As another example, the scores from the scorers 404 may be based only on the outputs of the respective keyword detectors 402, and the beam selector 405 may determine beams based on those scores and may use the outputs from the signal analyzers 403 to further determine the active beam. For example, where two scores for two listening zones are equal (or are sufficiently close to each other), the beam selector 405 may use the outputs from respective ones of the signal analyzers 403 as a tie breaker to select from between the two listening zones.

If one or more active beams have been selected for listening for subsequent speech, those one or more active beams may be implemented using the one or more microphone arrays 301. If the one or more active beams are implemented, a speech processor 406 can listen for and analyze any subsequent speech detected via the one or more active beams. The speech recognizer 406 may use any type of speech recognition algorithm, such as by using one or more speech recognition algorithms known in the art. The speech processor 406 may be performed by the voice-enabled device 188 and/or physically located in the same housing as the remainder of the voice-enabled device 118, or it may be implemented by another device and/or physically located elsewhere. For example, the speech processor 406 may be implemented by the voice-enable device 118 and/or the application server 107. Where the speech processor 406 is at least partially implemented by the application server 107, the voice-enabled device 118 may send data representing the subsequent speech to the application server 107, and the application server 107 may recognize the subsequent speech using this data, and then send information representing the result of the recognition (e.g., in the form of data representing a transcript of the recognized speech) to the voice-enabled device 118 and/or to another device such as to the content server 106. For example, if the subsequent speech relates to content (e.g., a movie, or a website) stored at the content server 106, then the application server 107 and/or the voice-enabled device 118 may send a request to the content server 106 for the content identified in the recognized subsequent speech. In response, the content server 106 may provide the content, such as to the voice-enabled device 118 and/or to another device at the premises 102*a*.

Figure 5:
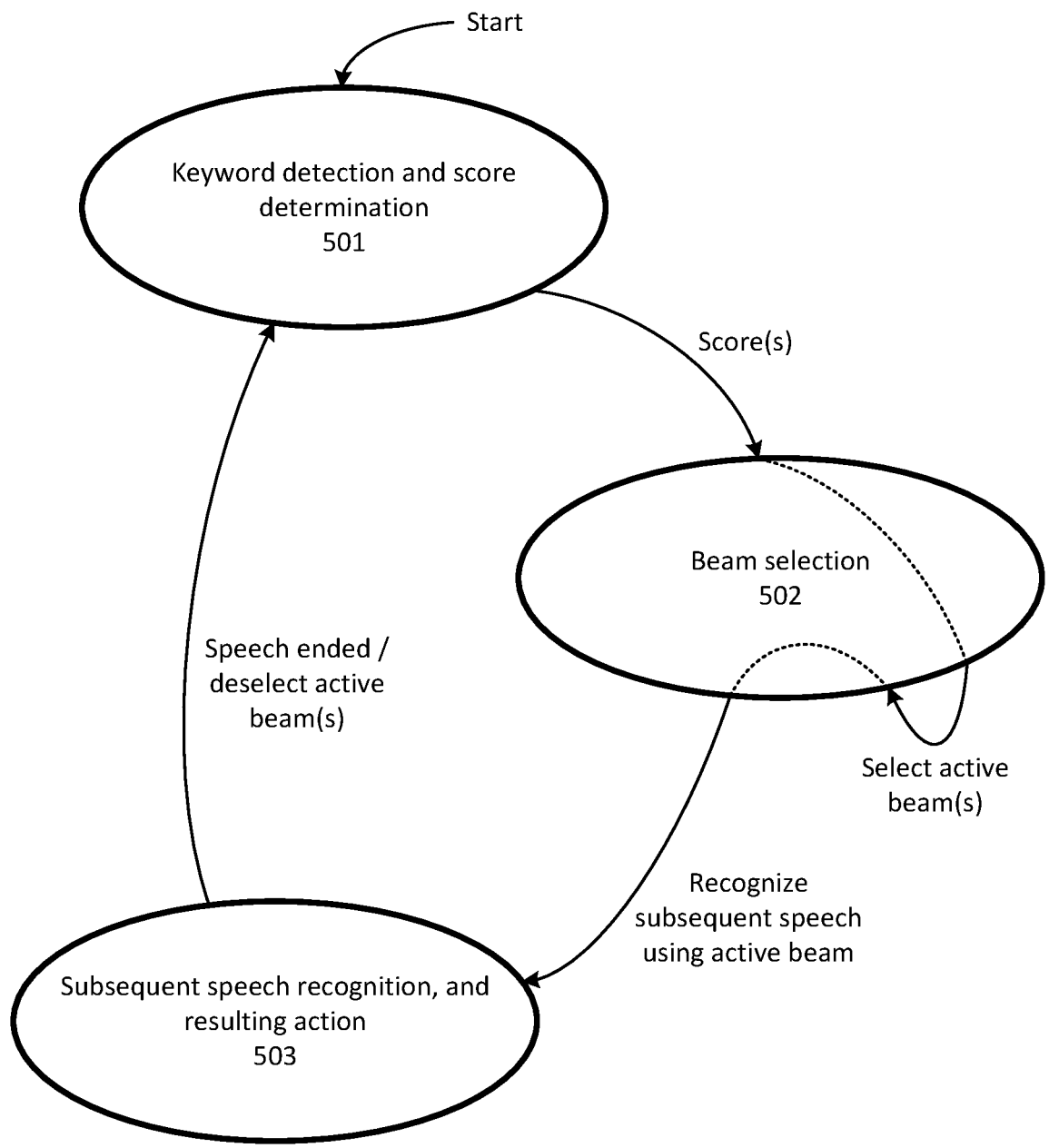
FIG. 5 is a state diagram showing an example method for implementing keyword detection, beam selection based on the detected keyword, and subsequent speech recognition using the selected beam.

FIG. 5 is a state diagram showing an example method for implementing keyword detection, beam selection based on the detected keyword, and subsequent speech recognition using the selected active beam. In a state 501, the voice-enabled device 118 may listen for a keyword, such as one occurring at one of multiple listening zones (e.g., the listening zones 1-4 as in FIG. 4). State 501 may be part of a keyword listening mode of voice-enabled device 118, in which the voice-enabled device 118 listens for a keyword from multiple directions and/or from any direction. If a keyword is detected, scores may be calculated (e.g., using the scorers 404).

These scores may be reported, and the voice-enabled device 118 may move to a state 502. In state 502, one or more active beams may be selected (e.g., using the beam selector 405) based on the scores received from state 501. The one or more active beams may be implemented (e.g., using one or more of the microphone arrays 301) based on the selection.

The voice-enabled device 118 may, for example, after the one or more active beams are implemented, move to a state 503 to recognize subsequent speech (e.g., using the speech recognizer 406) that is received via the one or more active beams. State 503 may be part of a subsequent speech listening mode of the voice-enabled device 118, in which the voice-enabled device 118 listens for the subsequent speech in one or more directions that are limited as compared with the keyword listening mode. For example, during keyword listening mode, the voice-enabled device 118 may listen in a 360-degree pattern around a horizontal plane of the voice-enabled device 118 (and/or around a vertical plane of the voice-enabled device 118). However, for example, in subsequent speech listening mode, the voice-enabled device 118 may listen in less than a 360-degree pattern and may listen in only a smaller angle defined by the one or more active beams, such as an angle of ninety degrees or less, or an angle of thirty degrees or less. If it is determined that the subsequent speech as ended, the voice-enabled device 118 may move back to state 501 to await the next keyword. Although examples are discussed with regard to a horizontal plane of listening, the voice-enabled device 118 may listen in any one or more desired directions and angles, both horizontally and vertically, around an imaginary sphere surrounding the voice-enabled device 118.

State 503 may also involve determining, based on the recognized keyword and/or subsequent speech, an action that should be taken, and then performing that action. The action may include, for example, sending a particular command to another device, obtaining particular information (e.g., data) from a data source, responding to the person who spoke with a voice response or other user interface response, and/or performing some physical activity such as moving a motor or flipping a switch. The commands may be, for example, commands for causing another device (e.g., another one of the devices 110-117, 120-122, or 125) to perform some task, such as commanding the thermostat 121 to raise or lower the temperature; commanding a smart hub (e.g., the gateway 111) to turn on or off lights, open or close a garage door, or start or stop a vehicle; or commanding the security system 122 to initiate or end a secure mode, record video from a security camera, or lock or unlock a door. The information obtained may be, for example, information indicating the weather, information indicating the state of a particular device (such as the current temperature setting of the thermostat 121), and/or information obtained from an external network (such as from the external network 109) and/or from one or more servers (such as the servers 105-107). The information obtained may be used to generate a response (for example, a voice response via the speaker 214) to the person speaking.

Figure 6:
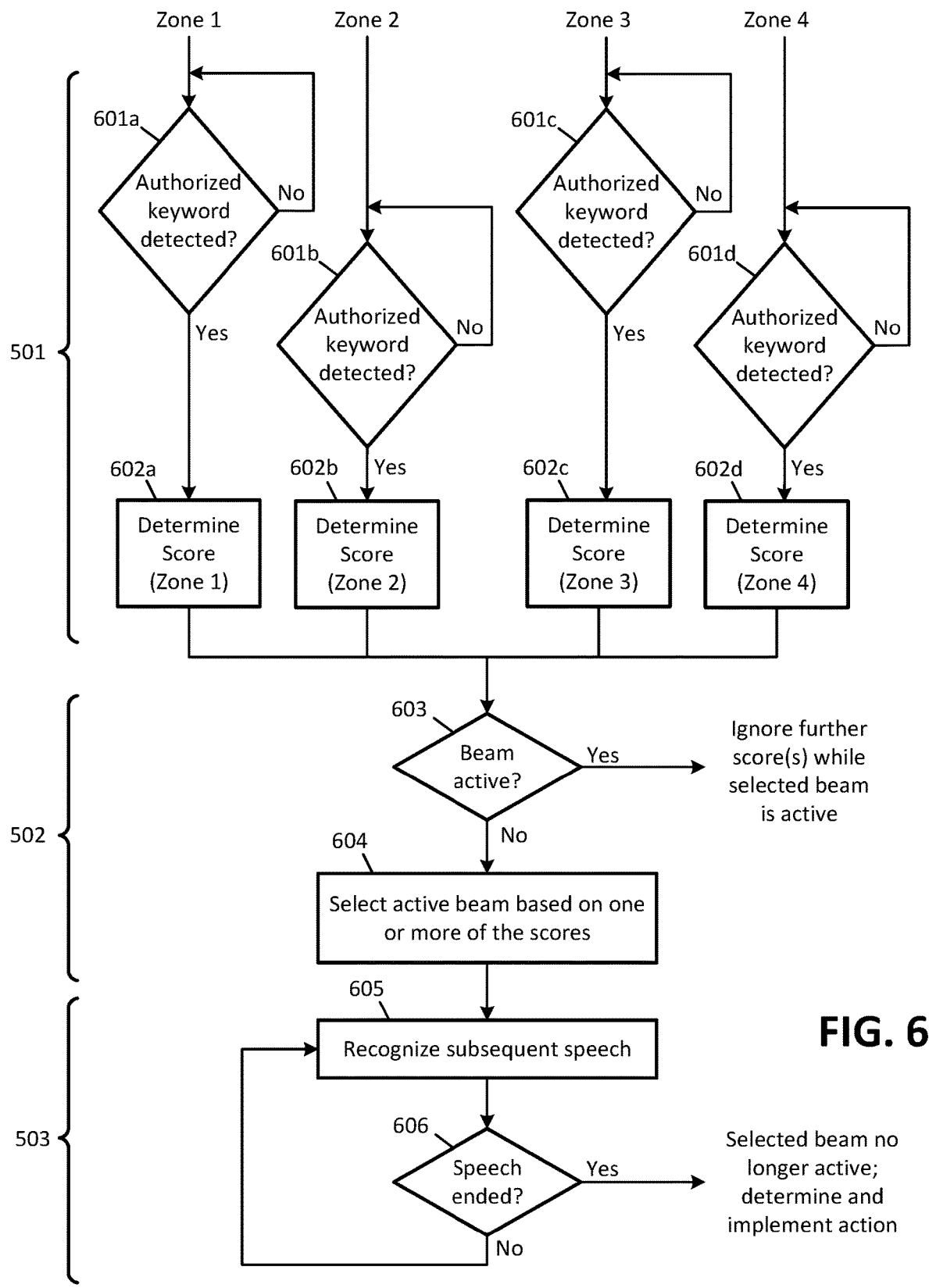
FIG. 6 is a flow chart showing an example implementation of the state diagram of FIG. 5.

FIG. 6 is a flow chart showing an example implementation of the state diagram of FIG. 5.

The steps in the flow chart may be performed by, for example, the voice-enabled device 118, such as the voice-enabled device 118 of FIGS. 1, 3, and 4. However, any one or more of the steps may be performed by other devices, such as by the interface 120 and/or the application server 107. The example flowchart is shown as logically divided into the three previously-discussed states 501-503.

The process may begin at state 501 (e.g., keyword listening mode), such that the process listens for a keyword to be spoken as detected in one or more of the listening zones. Thus, at any of steps 601*a*-601*d*, it may be determined whether a spoken keyword has been detected via one or more of the microphone arrays 301 in a respective one of the listening zones. For example, all of the listening zones (in this example, four listening zones) may each detect the keyword. Or, only a subset of the listening zones may each detect the keyword. Steps 601a-601d may be performed by, for example, the keyword detectors 402a-402d, respectively.

In addition to detecting whether a keyword has been uttered in a given listening zone, it may also be determined whether the spoken keyword is authorized. For example, one or more of the keyword detectors 402 may determine, based on the detected sound, the age, gender, and/or identity of the person speaking the keyword. Based on any of these voice characteristics, the one or more of the keyword detectors 402 may determine whether the keyword is authorized—that is, spoken by a person authorized to speak that keyword.

To accomplish this authorization check, the one or more keyword detectors 402 may analyze the detected audio to determine speech-related characteristics, such as gender of the speaker, the age of the speaker, and/or the identity of the speaker based on known voice characteristics of one or more speakers. These known voice characteristics, along with speaker profile data, may be stored by the voice-enabled device 118 and/or by a different physical device, such as in the non-rewritable memory 202, the rewritable memory 203, the removable media 204, and/or the hard drive 205. The speaker profile data may indicate which persons are authorized to (and/or not authorized to) speak certain keywords and/or make certain voice commands and/or requests in the subsequent speech. This may be used to implement, for example, parental control for voice commands. For example, the speaker profile may indicate that a certain person, or that any person under a certain age, is not authorized to speak the keyword, or to perform a particular command via the subsequent speech such as changing the thermostat temperature. Or, the speaker profile may indicate that the certain person, or that any person under a certain age, is not authorized to play an asset (e.g., a video) during a certain timeframe of the day, or a particular type of asset such as a video having a certain rating (e.g., an "R" rating). Thus, the system could provide for age-range enabled services based on voice recognition. To accomplish this, the one or more keyword detectors 402 may compare the detected audio to determine speech-related characteristics with the known voice characteristics to determine information about the person speaking the keyword (such as the gender of the speaker, the age of the speaker, and/or the identity of the speaker), and use that information about the person speaking and the speaker profile to determine whether the person is authorized to speak the keyword. If the keyword is recognized but the speaker is not authorized, the voice-enabled device 118 may provide feedback to the person speaking (e.g., an audible response such as a particular tone) to indicate that the keyword was recognized by that the voice-enabled device 118 will not otherwise act on the keyword.

Figure 7A:
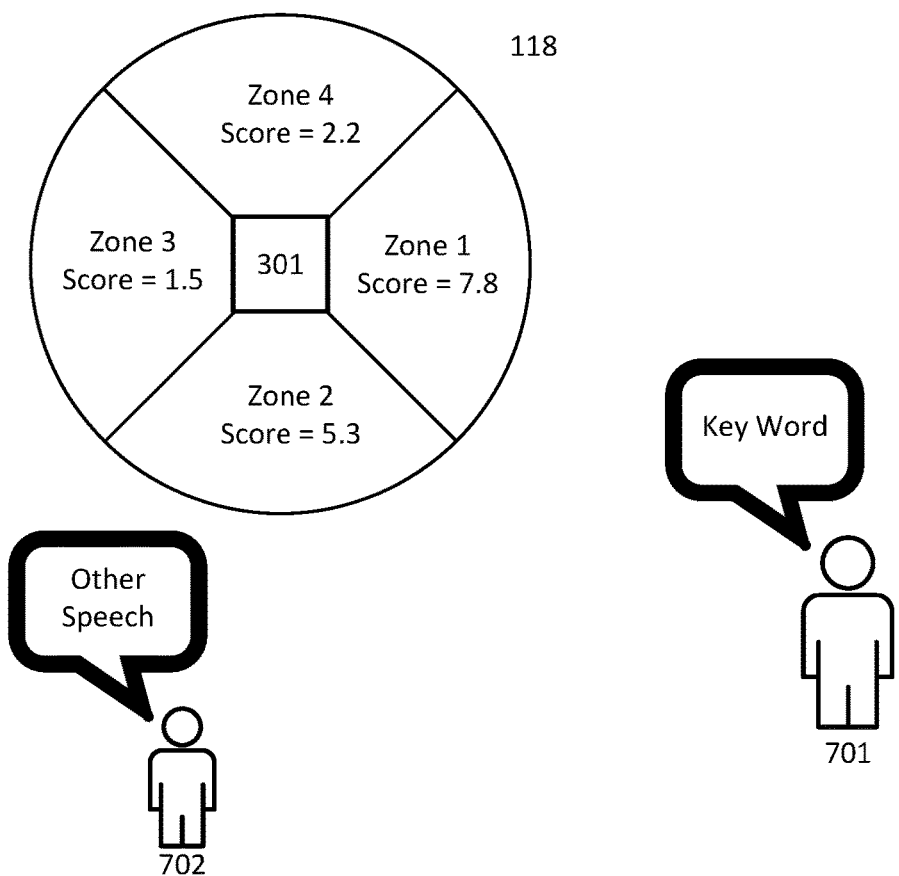
FIGS. 7A-7C and 8A-8C show example scenarios for performing keyword detection, beam selection based on the detected keyword, and subsequent speech recognition using the selected beam.

If an authorized keyword has been detected for one or more of the listening zones, the process for those one or more listening zones may move to respective steps 602a-602d, during which the one or more previously-discussed scores may be generated for one or more of the listening zones. Steps 602a-602d may be performed by, for example, the scorers 404a-404d, respectively. Steps 602a-602d may also take into account any signal analysis results for each listening zone, such as those signal analysis results provided by the signal analyzers 403a-403d, respectively. Thus, the scores generated at steps 602a-602d may be based on one or both of the outputs of the keyword detectors 402 and/or the signal analyzers 403. An example of such scores is shown in FIG. 7A, in which for a given keyword spoken by a person 701, the listening zone 1 is given a score of 7.8, the listening zone 2 is given a score of 5.3, the listening zone 3 is given a score of 1.5, and the listening zone 4 is given a score of 2.2. The score values in FIG. 7A range, by way of example, from zero to ten, where a higher value indicates a more desirable score. However, the scores can be ranged and scaled in any other way desired.

The process may independently move between steps 601 and 602 for each listening zone. Thus, for example, the process may move from step 601a to step 602a for the listening zone 1 when an authorized keyword has been detected in the listening zone 1, while at the same time the process may remain at step 601b for the listening zone 2, continuing to loop back through the "no" path until an authorized keyword has been detected for the listening zone 2. Thus, at any given time, one or more scores may be generated for all of the listening zones or for only a subset of the listening zones. Referring to a variation of the example of FIG. 7A, there may be scores for the listening zone 1, the listening zone 2, and the listening zone 4, but no score for the listening zone 3 since it is pointing almost in the opposite direction as the person 701 speaking the keyword. In this variation, only three scores may be provided for evaluation, or four scores may be provided for evaluation where one of them (the listening zone 4) is a score of zero.

There may be other sources of sound while the keyword is being listened for and/or spoken. For example, another person 702 may be producing other speech that does not contain a keyword. Other examples of non-keyword sounds, other than non-keyword speech, include background noises, air conditioning vents, appliances, and television sounds. The voice-enabled device 118 may ignore such other non-keyword sounds and consider them noise. Thus, this other speech may be considered, by the signal analyzers 403, as being part of the noise component in the reported SNR. Moreover, the SNR, for example, may be used as a factor in calculating a score for a particular listening zone. For instance, in the FIG. 7A example, due to the location of the person 702, the listening zone 2 and the listening zone 3 may experience greater noise from the other speech of person 702 than do the listening zone 1 and the listening zone 4. This may cause the scores of the listening zone 2 and the listening zone 3 to be lower than they would without the person 702 speaking. Alternatively, the scores of the listening zone 2 and the listening zone 3 may not be affected by the person 702 speaking, and instead the lowered SNR resulting from person 702 speaking may be used later, in step 604, in combination with the scores to determine one or more active beams.

At step 603 of FIG. 6, it may be determined whether any beams are currently active. If not, the process may move to step 604. If there is at least one beam currently active, the process may ignore the scores generated from steps 602a-602d and/or ignore all of the keyword detectors 402, and continue to ignore further scores and/or the keyword detectors 402 until no beams are currently active.

At step 604, the process moves to state 502, and one or more active beams are determined based on the scores. Where the scores are not based on the results of the signal analysis, the one or more active beams may be determined based on the scores and the results of the signal analysis. The one or more active beams may have a fixed direction and/or fixed width for the duration of the subsequent speech.

Figure 7B:
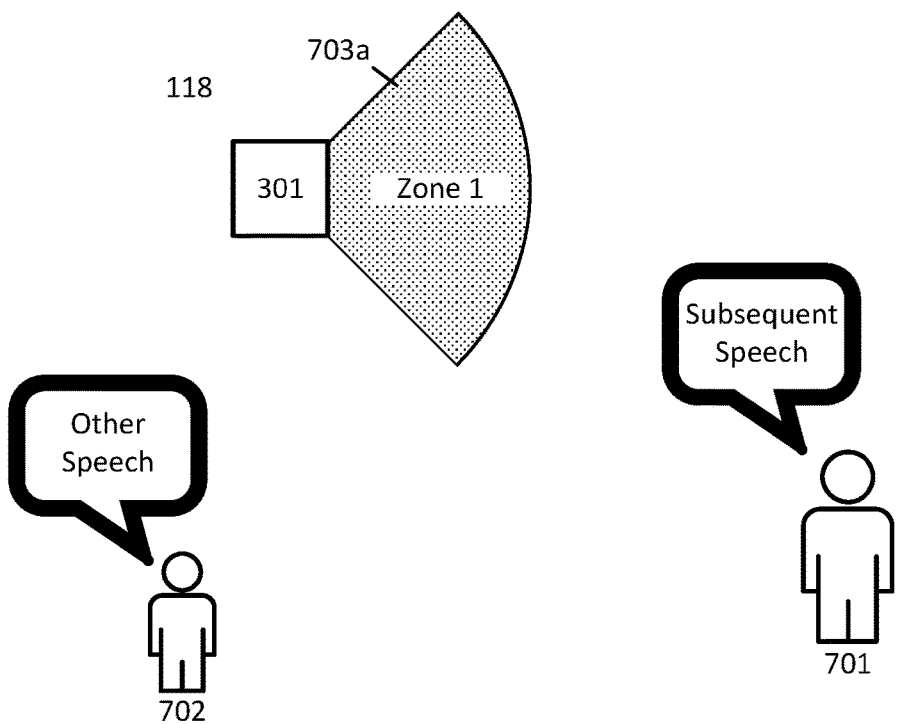

An example of a selected active beam is shown in FIG. 7B, in which a selected active beam 703a is the listening zone 1—the same listening zone used for step 601a. This may be because the listening zone 1 has the highest score of all of the listening zones, and/or because Listening zone 1 may have a greater SNR as compared with the next-highest-scoring listening zone (the listening zone 2) due to the interference from the person 702 speaking.

Figure 7C:
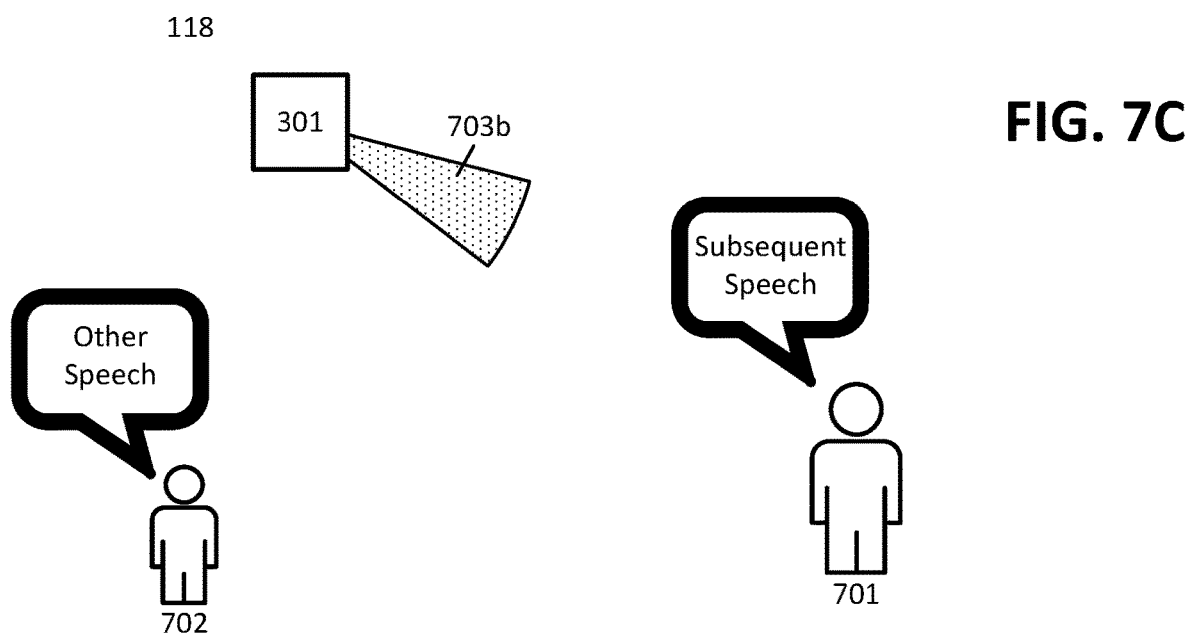

Another example of a selected active beam is shown in FIG. 7C, in which a selected active beam 703b is different from any of the listening zones used during steps 601a-601d. In the example of FIG. 7C, the active beam 703b is narrower (having a smaller width) than each of the listening zones 1-4, and having a center direction different from the center directions of any of the listening zones 1-4. However, the active beam 703b may be wider (having a larger width) than one or more of the listening zones 1-4, and may have a center direction equal to one of the listening zones 1-4, as desired. The direction, width, and distance that the active beam 703b extends may be determined at step 604 based one or more of the reported scores from one or more of steps 602a-602d, and/or may be based on the reported signal analysis results such as measured SNR, frequency, and/or amplitude for one or more of the listening zones.

One or more characteristics of an active beam may be interpolated based on multiple scores and/or multiple signal analysis results. For example, referring to FIG. 7C, the active beam 703b may have a direction that is the weighted average of the directions in which multiple ones of the listening zones are pointed. The listening zones used for calculating the direction of the active beam 703b may be selected as being listening zones adjacent to one another and/or having the highest scores. For example, the listening zone 1 and the listening zone 2 have the two highest scores and are adjacent to one another. The direction of active beam 703b may be determined as the weighted average of the directions of the listening zone 1 and the listening zone 2, where they are weighted by their respective scores, e.g.: (SZ1*DZ1+SZ2*DZ2)/(SZ1+SZ2)=DAB, where SZ1 and SZ2 are the scores of the listening zone 1 and the listening zone 2, respectively, DZ1 and DZ2 are the directions of the listening zone 1 and the listening zone 2, respectively, and DAB is the direction of the active beam. In making this calculation, the directions of the listening zones and the active beam may be encoded, for example, as numerical values such as degrees around a circle. Thus, in such an example, the listening zone 1 may have a direction of 90 degrees and the listening zone 2 may have a direction of 180 degrees, and so the active beam in the FIG. 7C example would have a direction of (7.8*90+5.3*180)/(7.8+5.3) =126.4 degrees.

If the scores of the listening zone 1 and the listening zone 2 were identical or sufficiently similar (such as within a predetermined threshold amount of each other), the signal analysis results (e.g., SNR) for the two listening zones may be used as a tie-breaker. For example, the listening zone having the higher SNR may be selected as the active beam, or the listening zone having the higher SNR may be used to additionally weight/bias that listening zone in the above calculation.

The width of an active beam may also be determined based on the scores and/or signal analysis results for various listening zones. For example, the width may be wider if the scores of two adjacent listening zones (e.g., Listening zone 1 and Listening zone 2) are similar to each other, and the width may be narrower if the scores of those listening zones are more different from each other. Alternatively, the width of an active beam may be predetermined and/or fixed regardless of the scores. For example, the width of an active beam may be approximately half the width of a listening zone, or less than half the width of a listening zone.

The width of each one or more active beam may also be determined based on the signal analysis results so as to suppress unwanted noise. For example, if the SNR of a listening zone is particularly high (e.g., higher than a pre-determined threshold value, or higher by a predetermined threshold amount than the SNR of another listening zone), the width of an active beam may be narrowed to at least partially exclude that noisy listening zone. For instance, in the example of FIG. 7C, active beam 703b may have an width sufficiently narrow to exclude much of the non-keyword-related speech (e.g., considered noise) by the person 702.

Referring again to the flowchart of FIG. 6, the one or more active beams may (e.g., after one or more active beams have been determined) also be implemented in step 604 using the one or more microphone arrays 301, such as using acoustic beamforming techniques. The process may move to state 503 (e.g., subsequent speech listening mode), in which subsequent speech may be detected in step 605 using the one or more active beams. Because the one or more active beams may be directed more particularly to the person 701 who spoke the keyword, it may be expected that the subsequent speech within the one or more active beams may be related to the keyword, and also that any other speech from other directions (such as by the person 702) may be sufficiently suppressed by virtue of not being within the one or more active beams. In addition to determining an appropriate width of the one or more active beams, other ways of excluding noise may also be used during step 605, such as by using beamforming to point a null towards a noise source (e.g., towards the person 702), or by subtracting detected audio (e.g., noise) from one or more other listening zones (e.g., the listening zone 2 and/or the listening zone 3, which are more directed towards the person 702) from the audio signal detected using an active beam.

At step 606, it may be determined whether the subsequent speech has ended. For example, if a pause of sufficient duration (e.g., for at least a threshold amount of time) is detected, it may be determined that the subsequent speech has ended. As another example, the person may explicitly speak a predetermined keyword that indicates the end of the subsequent speech, such as "over" or "end." As another example, the subsequent speech may be analyzed (e.g., by analyzing a transcription of the subsequent speech) to determine the command is complete. For example, it may be determined that the subsequent speech "watch NBC" is complete because the subsequent speech indicates both an action (watch) and an object of that action (NBC). If it is determined that the subsequent speech has not yet ended, further subsequent speech may continue to be recognized at step 605 until such time that it is determined that the subsequent speech has ended. If it is determined that the subsequent speech has ended, the one or more active beams may be deselected by rendering them no longer active. The speaker profile discussed above may be used to determine whether the person speaking is authorized to perform the action or inquiry specified in the recognized subsequent speech. If not, then the voice-enabled device 118 may provide a feedback (e.g., via a tone) indicating that the person is not authorized. If the person is determined to be authorized, then the voice-enabled device 118 may determine, based on the recognized keyword and/or subsequent speech, the one or more actions to be performed as discussed above. For example, as discussed above, an action may include sending a particular command to another device, obtaining particular information (e.g., data) from a data source, responding to the person who spoke with a voice response or other user interface response, and/or performing some physical activity such as moving a motor or flipping a switch. The process may return to state 501 (e.g., to steps 601*a*-601*d*), and the voice-enabled device 118 may cause the one or more microphone arrays 301 to return to a state in which the original listening zones (e.g., the listening zones 1-4) are used to detect the next keyword. The process may return to state 501 prior to the action being determined or performed, or during the performance of the action, or after the action has been performed.

Figure 8A:
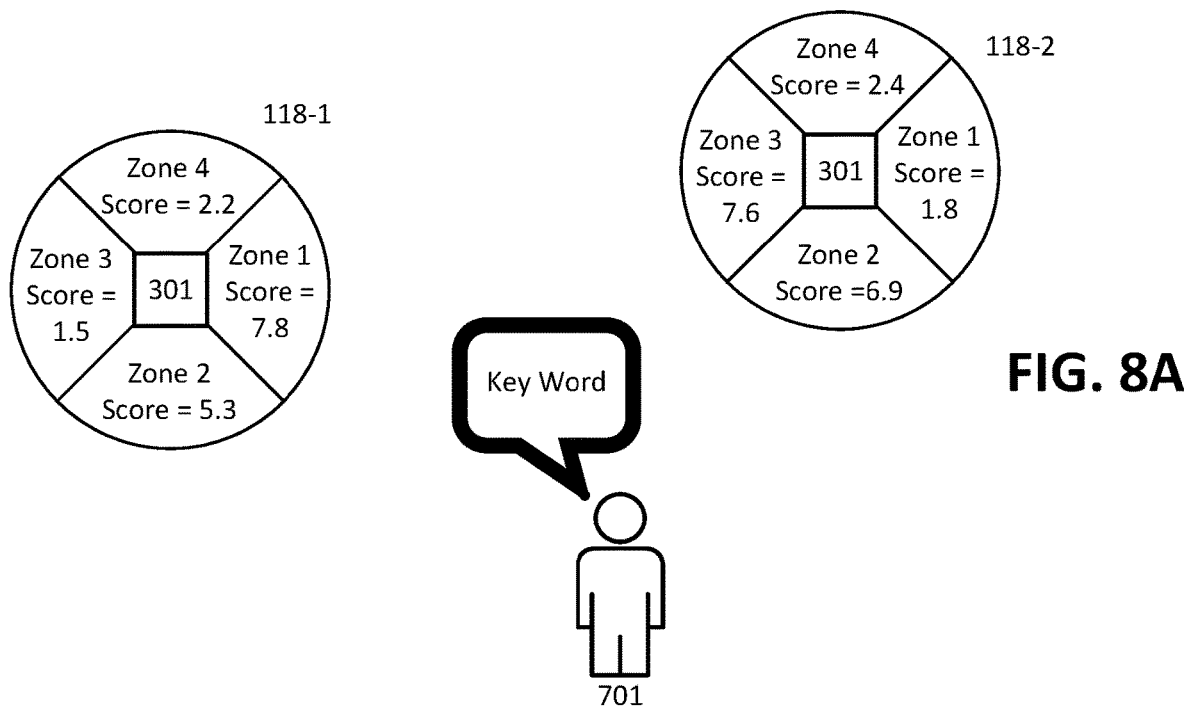
Figure 8B:
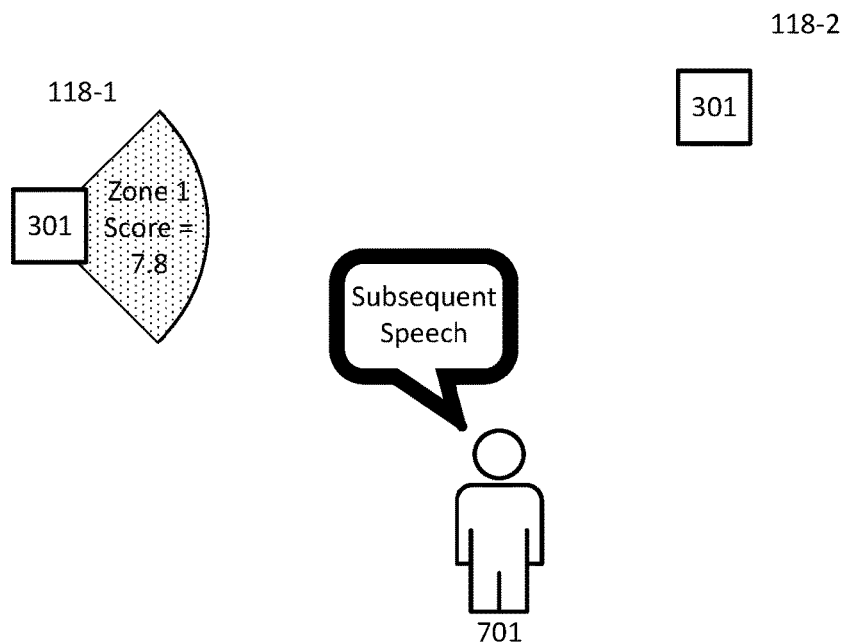
Figure 8C:
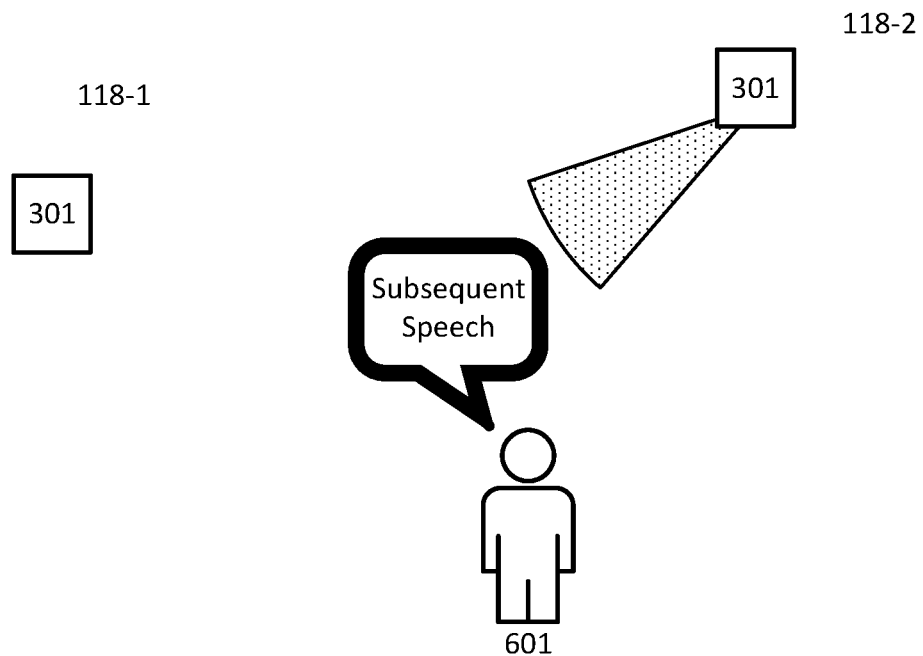

FIGS. 8A-8C show another example scenario for performing keyword detection, beam selection based on the detected keyword, and subsequent speech recognition using the selected beam. In these figures, there are multiple voice-enabled devices 118 that may be simultaneously listening for a keyword. In the example of FIGS. 8A-8C, there are two such voice-enabled devices 118-1 and 118-2. However, there may be any number of voice-enabled devices. The multiple voice-enabled devices 118-1 and 118-2 may each be close enough to simultaneously hear a user speak. For example, they may be located in the same room, such that when the user is in the room, each of the voice-enabled devices 118-1 and 118-2 may hear the user speak. As another example, the voice-enabled devices 118-1 and 118-2 may be far enough away from each other that only one or the other may be able to hear the user speak at any given time. For example, the voice-enabled devices 118-1 and 118-2 may be in separate rooms.

Each of the voice-enabled devices 118-1 and 118-2 may have its own set of one or more microphone arrays 301, and each may independently operate in accordance with the state diagram of FIG. 5 and/or the flowchart of FIG. 6. The voice-enabled devices 118-1 and 118-2 2 may communicate with each other, such as via wireless communications (e.g., Wi-Fi) and/or wired communications (e.g., USB and/or Ethernet cabling). For example, each of the voice-enabled devices 118-1 and 118-2 may send data to the other one or more voice-enabled devices 118-1 and 118-2, indicating that a keyword was detected by the voice-enabled device, the scores that were calculated for the keyword and for that voice-enabled device, and/or the signal analysis results for the keyword and for that voice-enabled device. As will be discussed below, such communication amongst two or more voice-enabled devices may allow the voice-enabled devices to determine which listening zone(s) of which voice-enabled device(s) should be used to listen for the subsequent speech associated with the keyword.

For example, as shown in the example of FIG. 8A, the person 701 may speak a keyword, and each of the two voice-enabled devices 118-1 and 118-2 may separately determine scores, for their respective listening zones, for the detected keyword. In this example, the voice-enabled devices 118-1 and/or 118-2 may determine that the listening zone 1 of the voice-enabled device 118-1 has the highest score, and so the listening zone 1 may to be used as an active beam to listen for the subsequent speech as shown in FIG. 8B.

To reach this decision, one or both of the voice-enabled devices 118-1 and/or 118-2 (and/or another device, such as the application server 107) may communicate its scores and/or signal analysis results to the other voice-enabled device. One or both of the voice-enabled devices 118-1 and/or 118-2 may use this communicated information to determine the active beam to be used for subsequent speech. Thus, this information may be used for conflict resolution between multiple voice-enabled devices 118. For example, the voice-enabled device 118-1 may send its information to voice-enabled device 118-2. The voice-enabled device 118-2 may determine, based on the received information and the scores and/or signal analysis corresponding to its own listening zones, that the listening zone 1 of the voice-enabled device 118-1 is to be used for subsequent speech. For instance, the voice-enabled device 118-2 may compare all of the scores for all of the listening zones of all of the voice-enabled devices 118, and select the highest-scoring listening zone to be the active beam for subsequent speech. Thus, for example, steps 601-602 (FIG. 6) may be performed in parallel for multiple ones of multiple voice-enabled devices, and step 604 may take into account the scores and/or signal analysis results of the multiple listening zones of the multiple voice-enabled devices. If the desired listening zone/active beam is selected, the voice-enabled device 118-2 may send a message to the voice-enabled device 118-1 indicating that the listening zone 1 of the voice-enabled device 118-1 is to be used as the active beam.

FIG. 8C shows another example of how the active beam may be selected in a multiple voice-enabled device environment. In this example, the voice-enabled device 118-2 (and/or another device, such as the application server 107) may determine that the active beam is not any particular listening zone, but instead is a newly-formed beam having a particular width, direction, and/or distance based on the collective scores and/or signal analysis results of multiple listening zones of the voice-enabled devices 118-1 and 118-2. In this example, the voice-enabled device 118-2 (and/or another device, such as the application server 107) may determine, based on the scores and/or signal-analysis results of the listening zones of both of the voice-enabled devices 118-1 and 118-2, the active beam to be generally pointing between the listening zones 1 and 2 of the voice-enabled device 118-2. This active beam is shown in FIG. 8C. The decision as to which of two or more of the voice-enabled devices 118 are to be used to create the active beam may be based on, for example, the scores and/or signal-analysis results of the various zones of the two or more voice-enabled devices 118. Where relying on the scores and/or the signal-analysis results would render a tie between two or more of the voice-enabled devices 118, then a tie-breaker decision may be implemented. For example, in the event of a tie between a plurality of the voice-enabled devices 118, the voice-enabled device 118, of the plurality of the voice-enabled devices 118, having the highest MAC address, may be selected to generate the active beam.

The one or more voice-enabled devices 118 discussed herein may be part of a larger system, and/or may communicate with one or more other devices in the system. For example, each of the voice-enabled devices 118 may communicate with a security system and/or with one or more Internet-of-Things (IoT) devices. When a keyword and subsequent speech is detected and recognized by one of the voice-enabled devices 118, the voice-enabled device 118 may send a message (e.g., a command, inquiry, and/or data), associated with the keyword and/or subsequent speech, to another device that is configured to act on that message. For example, if the user speaks the keyword "temperature" followed by the subsequent speech "73 degrees," the listening voice-enabled device 118 may send a command to another device, such as a connected thermostat, indicating a temperature of 73 degrees.

Another example of a device that may be in communication with one or more of the voice-enabled devices 118 is a video camera. One or more of the voice-enabled devices 118 may use image information from the video camera to determine which way the user is facing to help determine which of the voice-enabled devices 118 should be used to generate the active beam, and/or to understand which other IoT device the user is apparently addressing. If the keyword is ambiguous, for example it is not clear whether the user is trying to adjust the temperature of a connected thermostat or a connected refrigerator, the image information may be used by the voice-enabled devices 118 to determine whether the user is facing the thermostat or the refrigerator while speaking. Based on this information, the voice-enabled devices 118 may determine that the user is addressing the thermostat or the refrigerator, may recognize the keyword and/or subsequent speech as being in the context of the thermostat or the refrigerator, and may send the message to the determined one of those devices. Image information from the video camera may also be used by the voice-enabled device 118 to determine the identity, age, and/or gender of the person speaking. As discussed previously, the identity, age, and/or gender of the person speaking may be used to authorize spoken commands.

In further examples, one or more of the voice-enabled devices 118 may be part of a handheld, wearable, or other portable device such as a remote control. The portable device may include one or more sensors (e.g., accelerometers) for sensing and reporting movement, orientation, and/or position of the handheld device, such as to detect movement gestures by a person holding/wearing the portable device. The gesture information may be used as a factor in recognizing a keyword and/or subsequent speech spoken at around the same time as the gesture. For example, if the user points the remote control toward the thermostat rather than the refrigerator, the voice-enabled device 118 may determine that the speech is directed to commanding the thermostat. The movement detected by the sensors may also be used to help identify the person speaking, by comparing the detected movement with a pre-stored movement "fingerprint" associated with that user. Again, as discussed previously, the identity of the person speaking may be used to authorize spoken commands.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, by a computing device and from a plurality of microphones, one or more indications of first speech detected in a plurality of listening zones;
   determining, based on the one or more indications of the first speech, that the first speech comprises a keyword;
   determining a direction associated with the keyword;
   detecting, using an acoustic beam formed by at least some of the plurality of microphones, pointed in the direction associated with the keyword, and having a width that is narrower than a width of each of the plurality of listening zones, second speech associated with the keyword; and
   recognizing the second speech to generate an indication of recognized speech.

2. The method of claim 1, further comprising:
   determining, based on the indication of the recognized speech, a device;
   determining, based on the indication of the recognized speech, a command; and
   sending the command to the device.

3. The method of claim 1, wherein the direction of the acoustic beam is fixed during the detecting the second speech.

4. The method of claim 1, wherein the direction of the acoustic beam is different than a direction of each of the plurality of listening zones.

5. The method of claim 1, wherein the determining the direction comprises:
   determining, for one or more of the plurality of listening zones, one or more scores based on the one or more indications of first speech; and
   determining, based on the one or more scores, the direction.

6. The method of claim 1, wherein the plurality of microphones comprises a plurality of microphone arrays, and wherein each of the microphone arrays is associated with a different one of the plurality of listening zones.

7. The method of claim 1, wherein the plurality of listening zones comprises a plurality of acoustic beams that are each different from the acoustic beam used to detect the second speech.

8. The method of claim 1, wherein the keyword comprises a plurality of words.

9. A method comprising:
   determining, by a computing device, based on signals from a plurality of microphones, and for a plurality of directions, audio characteristics associated with first speech;
   determining that the first speech comprises a keyword;
   determining, based on the audio characteristics, a direction and a width associated with the keyword;
   directing, using at least some of the plurality of microphones, an acoustic beam having the direction;
   detecting, using the acoustic beam, second speech; and
   recognizing the second speech to generate an indication of recognized speech.

10. The method of claim 9, further comprising:
    determining, based on the indication of the recognized speech, a device;
    determining, based on the indication of the recognized speech, a command; and
    sending the command to the device.

11. The method of claim 9, further comprising:
    determining, for the plurality of directions, scores based on the audio characteristics; and
    determining the direction based on the scores.

12. The method of claim 9, wherein the direction of the acoustic beam is different than any of the plurality of directions.

13. The method of claim 9, wherein the audio characteristics comprise one or more of amplitudes, confidence levels, or signal-to-noise ratios associated with the keyword.

14. A method comprising:
    detecting, by each of a plurality of devices, and using a plurality of microphones of each of the plurality of devices, first speech;
    determining that the first speech comprises a keyword;
    determining, for each of the plurality of devices, one or more scores associated with the keyword;
    determining, based on the one or more scores for each of the plurality of devices, a first device of the plurality of devices and a direction of an acoustic beam;

forming, using at least some of the plurality of microphones of the first device, the acoustic beam having the direction;

detecting, by the first device and using the acoustic beam, second speech; and recognizing the second speech to generate an indication of recognized speech.

15. The method of claim 14, wherein for each of the plurality of devices, each of the scores is associated with a different listening direction.

16. The method of claim 14, further comprising determining, based on the one or more scores for each of the plurality of devices, a width of the acoustic beam, wherein the forming comprises forming the acoustic beam having the width.

17. The method of claim 14, wherein the direction of the acoustic beam is fixed during the detecting the second speech.

18. The method of claim 14, further comprising:
determining, based on the indication of the recognized speech, a second device different than any of the plurality of devices;
determining, based on the indication of the recognized speech, a command; and
sending the command to the second device.

19. The method of claim 14, wherein the determining the direction of the acoustic beam is performed by a second device of the plurality of devices, the method further comprising causing, by the second device, the first device to form the acoustic beam.

20. The method of claim 9, wherein the acoustic beam has the width that is determined.

\* \* \* \* \*

UNITED STATES PATENT AND TRADEMARK OFFICE
CERTIFICATE OF CORRECTION

PATENT NO. : 11,238,853 B2
APPLICATION NO. : 16/669195
DATED : February 1, 2022
INVENTOR(S) : Kurtz It is certified that error appears in the above-identified patent and that said Letters Patent is hereby corrected as shown below:

In the Specification

Column 2, Detailed Description, Line 9:
After "disclosure", delete "¶"

Column 4, Detailed Description, Line 24:
Delete "112." and insert --118.-- therefor Column 7, Detailed Description, Line 7:
After "303.", delete "¶"

Column 8, Detailed Description, Line 18:
Delete "circuity" and insert --circuitry-- therefor Column 9, Detailed Description, Line 50:
Delete "circuity" and insert --circuitry-- therefor Column 9, Detailed Description, Line 59:
Delete "key" and insert --keyword-- therefor Column 9, Detailed Description, Line 63:
Delete "KeyDect1" and insert --KeyDet1-- therefor Column 9, Detailed Description, Line 65:
Delete "KeyDect2" and insert --KeyDet2-- therefor Column 11, Detailed Description, Line 26:
Delete "188" and insert --118-- therefor Signed and Sealed this
Thirteenth Day of June, 2023

Katherine Kelly Vidal
*Director of the United States Patent and Trademark Office*

CERTIFICATE OF CORRECTION (continued)
U.S. Pat. No. 11,238,853 B2

Column 17, Detailed Description, Line 33:
Delete "118-2 2" and insert --118-2-- therefor